US010783720B2

(12) United States Patent
Hogendoorn et al.

(10) Patent No.: US 10,783,720 B2
(45) Date of Patent: Sep. 22, 2020

(54) SYSTEM AND METHOD FOR DETERMINING AND REPORTING VALUE ADDED ACTIVITY DATA

(71) Applicant: FreePoint Technologies Inc., London (CA)

(72) Inventors: Paul Hogendoorn, London (CA); Sophear Net, London (CA); William Favaro, London (CA); Michael J. Foster, Sombra (CA); Daniel Kaptur, London (CA); Gregory Jacobs, Delaware (CA)

(73) Assignee: FREEPOINT TECHNOLOGIES INC., London, Ontario (CA)

( * ) Notice: Subject to any disclaimer, the term of this patent is extended or adjusted under 35 U.S.C. 154(b) by 494 days.

(21) Appl. No.: 14/938,209

(22) Filed: Nov. 11, 2015

(65) Prior Publication Data

US 2016/0146708 A1 May 26, 2016

Related U.S. Application Data

(60) Provisional application No. 62/078,087, filed on Nov. 11, 2014, provisional application No. 62/134,150, filed on Mar. 17, 2015.

(51) Int. Cl.

| | |
|---|---|
| ***G01M 99/00*** | (2011.01) |
| ***G07C 3/00*** | (2006.01) |
| ***G07C 3/06*** | (2006.01) |

(52) U.S. Cl.

CPC ............... *G07C 3/005* (2013.01); *G07C 3/06* (2013.01)

(58) Field of Classification Search

None

See application file for complete search history.

(56) References Cited

U.S. PATENT DOCUMENTS

| | | | | |
|---|---|---|---|---|
| 4,517,833 | A * | 5/1985 | Wesley | F02P 17/08 324/402 |
| 6,294,908 | B1 * | 9/2001 | Belmore | G01R 31/2806 324/754.15 |
| 2003/0150908 | A1 | 8/2003 | Pokorny et al. | |
| 2003/0212499 | A1 | 11/2003 | Carle et al. | |
| 2005/0127185 | A1 * | 6/2005 | Wilz, Sr. | G06K 7/10673 235/462.48 |
| 2009/0309742 | A1 * | 12/2009 | Alexander | G08B 21/10 340/601 |
| 2011/0074596 | A1 | 3/2011 | Frohlick et al. | |

(Continued)

OTHER PUBLICATIONS

S.H. Cheng, Noninvasive current sensor for household appliances and compensation for installation variation, Jan. 20, 2013, p. 112-120.*

(Continued)

*Primary Examiner* — Tung S Lau

(74) *Attorney, Agent, or Firm* — Carlson, Gaskey & Olds

(57) ABSTRACT

An illustrative example method of monitoring value added activity includes positioning a detector near a selected portion of a machine using a clip for situating the detector in a position where the detector can detect at least one electrical characteristic associated with operation of a machine; communicating an indication of the detected electrical characteristic between the detector and a user interface; and displaying a visual representation of value added activity information based the indication.

20 Claims, 5 Drawing Sheets

(56) References Cited

U.S. PATENT DOCUMENTS

| | | | | |
|---|---|---|---|---|
| 2011/0153541 | A1* | 6/2011 | Koch | G06Q 10/06 706/52 |
| 2011/0275328 | A1* | 11/2011 | Kwon | H04W 24/04 455/67.11 |
| 2012/0266209 | A1* | 10/2012 | Gooding | H04L 63/20 726/1 |
| 2012/0314084 | A1* | 12/2012 | Lammert | G01J 5/02 348/164 |
| 2013/0226317 | A1* | 8/2013 | Vijayaraghavan | G06Q 10/04 700/28 |
| 2015/0066164 | A1* | 3/2015 | Hogendoorn | G05B 19/4183 700/79 |

OTHER PUBLICATIONS

Kai Chen, Design of Power Supply for On-line Monitoring System of Transmission Lines, Copyright © 2013 SciRes. p. 570-574.*
Hioki, Clamp on power logger PW3365-20 power meter, 12 pages, Jun. 20, 2014. (Year: 2014).*

* cited by examiner

SYSTEM AND METHOD FOR DETERMINING AND REPORTING VALUE ADDED ACTIVITY DATA

CROSS REFERENCE TO RELATED APPLICATIONS

This application claims priority to U.S. Provisional Application No. 62/078,087 filed Nov. 11, 2014 and U.S. Provisional Application No. 62/134,150 filed Mar. 17, 2015.

BACKGROUND

The industrial revolution has brought with it many benefits. At the same time, however, an increasing disconnect between workers and their work has manifested itself. It is not uncommon for individuals to view their job as a series of repeated tasks without meaning beyond the immediate requirement of completing the task at hand. If it were possible to bring a greater sense of ownership and satisfaction to such individuals, their lives may be enhanced and their employer's would benefit in a variety of ways.

While a variety of approaches to monitoring manufacturing processes have been developed many are targeted at providing management an overall assessment of productivity or efficiency. None seem to address the individuals performing the tasks on a daily basis in a meaningful way. Those that include feedback for an individual do so on a very limited basis, such as a green light when a production goal is met or a red light when there is a problem. While such feedback can be useful it does not provide the type of information that allows the individual to recognize what they do well and that which they might be able to improve upon.

Some performance monitoring is possible but usually in limited situations in which a machine was designed with monitoring capabilities or a relatively complicated or expensive retrofit was required to incorporate monitoring equipment. A retrofit installation of monitoring equipment typically requires an electrician or other specially trained personnel and can only be accomplished while the machine is taken off-line or otherwise not used, which adds costs and decreases output at least during the installation phase. Any complications involved with a retrofit installation may compromise a machine or warranty coverage for the machine. These and other factors have inhibited productivity monitoring operations.

SUMMARY

An illustrative example system for monitoring productivity includes at least one monitoring device that obtains data regarding at least a selected one of production events. A reporting device receives the data and provides a report regarding the monitored events to an individual involved in the production. The report includes information regarding at least one characteristic of the monitored event. The information in the report is presented to the individual in a way that makes various aspects of performance apparent that may not otherwise have been observable or known. One example includes a graphic display of productivity over the course of a work day in a manner that shows how much of that day was spent in a productive manner and the level of production at various times.

In a disclosed example embodiment, the monitoring device is readily incorporated into a machine's environment without requiring any modification to the machine and without requiring any complex installation procedures. An example monitoring device has an adaptor portion that is configured to be situated in a strategic location relative to a machine. A detector is configured to detect at least one electrical characteristic of machine operation. An interpreter portion interprets the detected electrical characteristic and provides an indication of at least one feature of productivity based on the detected electrical characteristic.

An illustrative example method of monitoring productivity includes positioning a detector near a selected portion of a machine using a clip for situating the detector in a position where the detector can detect at least one electrical characteristic associated with operation of a machine; communicating an indication of the detected electrical characteristic between the detector and a user interface; and displaying a visual representation of productivity information based the indication.

An illustrative example system for monitoring productivity includes a detector and a user interface. The detector includes a sensor configured to detect at least one electrical characteristic, a transmitter for communicating an indication of the detected electrical characteristic to another device, and a clip configured to position the detector near a selected portion of a machine where the sensor can detect the at least one electrical characteristic. The user interface includes a receiver for receiving the indication of the detected electrical characteristic, a processor that generates an output based on the received indication, and a display that is configured to show a visual representation of productivity information based the processor output.

Various features and advantages of at least one example disclosed system and method will become apparent to those skilled in the art from the following detailed description. The drawings that accompany that description can be briefly described as follows.

DETAILED DESCRIPTION

Figure 1:
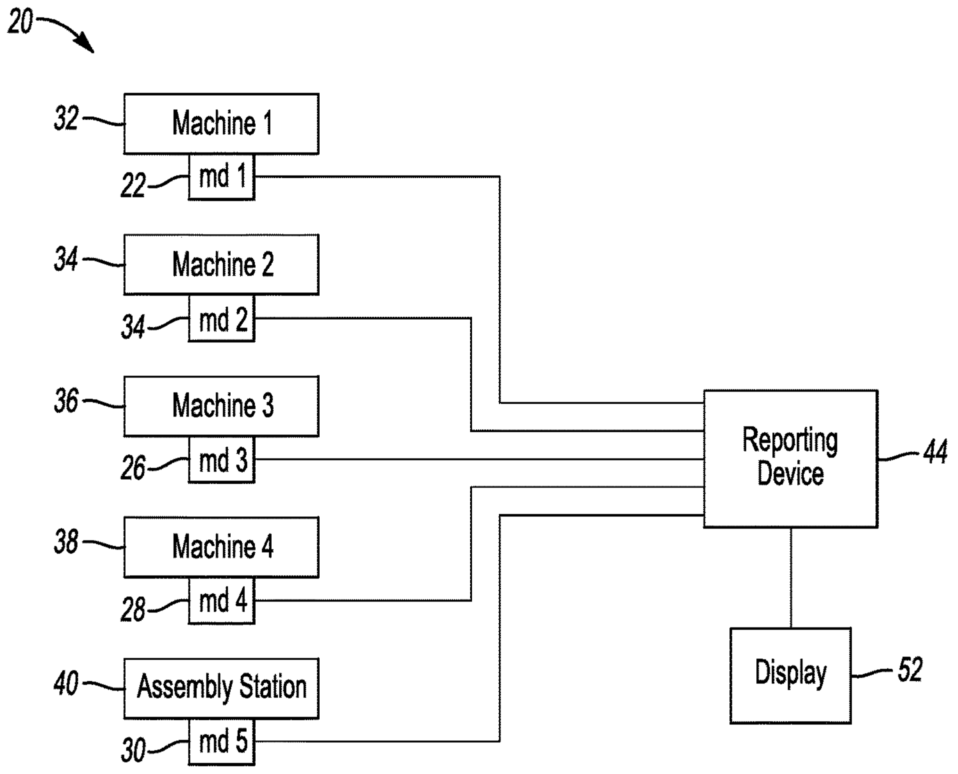
FIG. 1 schematically illustrates a system for monitoring and reporting productivity data designed according to an embodiment of this invention.

FIG. 1 schematically illustrates an example system 20 that is useful for monitoring and reporting productivity data within a facility that includes a variety of equipment. A plurality of monitoring devices 22-30 (md1-md5) are provided for monitoring a corresponding plurality of events or processes that occur during manufacturing. It should be noted that the term manufacturing is used in this description in a rather generic sense and should not be strictly construed. Example techniques that may be considered manufacturing for purposes of discussion include making, molding, forming, cutting, assembling, or securing operations.

The monitoring devices respectively obtain information for a selected one of the events or processes. In the illustrated example, each monitoring device 22-30 is associated with a particular machine or a particular portion of the equipment used during manufacturing. The monitoring devices 22, 24, 26 and 28 are respectively associated with machines 32, 34, 36 and 38. The machines 32-28 are at least partially automated and complete at least one process or cause at least one event to happen in an automated fashion. The corresponding monitoring devices obtain information regarding the automatic operation of those machines or at least selected portions of those machines. The monitoring device 30 is associated with a manual assembly station 40 that at least one operator uses to perform a manual task or operation.

The monitoring devices provide information to a reporting device 44 that provides a report regarding the various processes or events occurring at the different machines. In this example the monitoring devices 22-30 communicate with the reporting device 44 through a communication hub 46 while in other examples, one or more of the monitoring devices 22-30 communicates directly with the reporting device 44. The communications schematically shown in FIG. 1 may be accomplished using wired (e.g., serial or Ethernet) or wireless links (e.g., WiFi, Xbee or Bluetooth), depending on the configuration of the devices in a particular embodiment and the needs of a particular situation.

The monitoring devices 22-30 obtain information directly from the machines 22-38 or the assembly station 40, respectively, or a sensor or other device associated with the corresponding machine or station. Example sensors can include proximity sensors, limit switches, and foot pedal switches. The information is indicative of a selected feature or characteristic of at least one event or process that is part of the manufacturing process of interest. The selected feature or characteristic may be used as an indication of value added activity. There are a variety of known parameters that can be used, for example, to monitor the productivity or value added use of a machine during manufacturing or assembly processes. Example parameters include electrical current level, voltage level, on-off changes in machine or component status, communication signalling, component position, component movement, switch activation, and electric field. The particular parameter is typically not of interest in and of itself, but rather, the parameter is used as an indication of value added activity. The monitoring devices 22-30 gather such information to provide an indication of the value added aspects of one or more operations being completed by or at the machines 32-38 or the station 40.

Figure 2A:
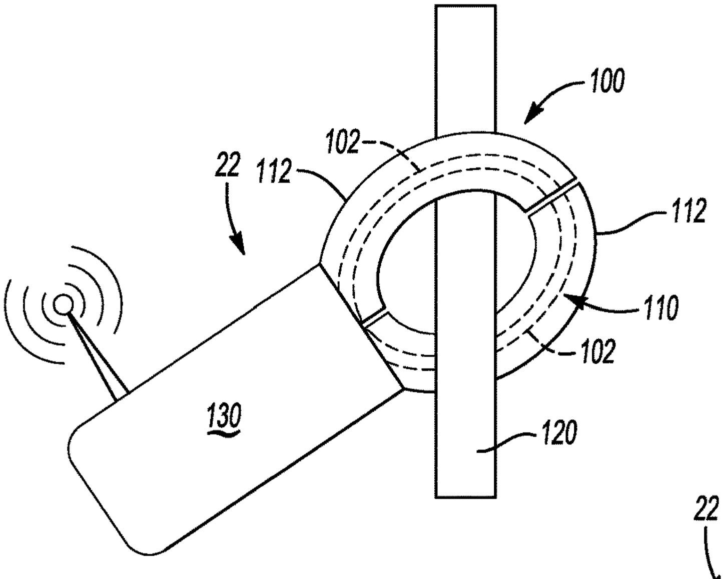
FIGS. 2*a* and 2*b* schematically illustrate an example embodiment of a monitoring device useful in a system such as that shown in FIG. 1.
Figure 2B:
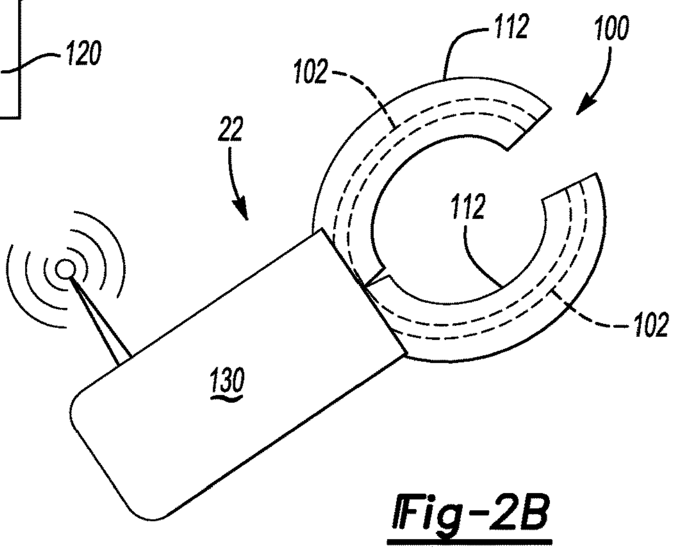

The monitoring devices 22-30 may take a variety of forms. One example embodiment of a monitoring device useful as any of the monitoring devices 22-30 (md1-md5) is shown in FIGS. 2*a* and 2*b*. For discussion purposes, this example monitoring device will be considered the monitoring device 22 from FIG. 1. The monitoring device 22 of FIGS. 2*a* and 2*b* is configured to utilize at least one electrical characteristic associated with the machine 32 while the machine is in use for providing an indication regarding the monitored process or task. The device 22 is configured to utilize at least one such characteristic to obtain information regarding the process or task of interest and to provide an appropriate indication that can be used by the reporting device 44.

The illustrated example monitoring device 22 does not require any complex or time consuming installation and does not require any modification to the machine 32. Instead, the device 22 may be considered non-invasive as it may be incorporated into the machine environment without making any alteration to the machine and without introducing any interruption to the operation of the machine 32. The illustrated example monitoring device can be clipped into place by hand within seconds in some situations.

The example of FIGS. 2*a* and 2*b* includes a "clamp on" sensor portion 100 that detects an electrical characteristic for monitoring productivity. The sensor portion 100 includes a split toroidal coil 102 having a magnetically permeable core that is useful as a current or voltage sensor. The sensor portion 100 comprises a housing 110 configured like a clamp having opposing clamp members 112 that are resiliently held toward each other in a closed position shown in FIG. 2*a*. The clamp members 112 are easily manipulated into an open position in which the clamp members 112 are spread apart enough to allow for placing the clamp members 112 over, around or onto a selected portion of a machine. In FIG. 2*a*, the monitoring device 22 is shown with the clamp members 112 in the closed position and situated about a conductor 120 that carries electrical power to the machine 32 during machine operation.

On at least some machines of interest the current going to the spindle drive motor is a useful indicator of productivity. When the spindle is under load, it requires more current than it does when it is spinning freely. In some instances, the presence of a control signal to a relay or solenoid coil that triggers the 'work' cycle on a machine provides an indication of productivity. Such changes in current or control signals are detectable using the monitoring device sensor portion 100.

The device 22 includes a processor portion 130 that conditions a signal based on the detected electrical characteristic, such as voltage or current. The processor portion 130 includes the ability to communicate with the communication hub 46 schematically shown in FIG. 1. The format or content of the information provided by the device 22 will vary depending on the process or event of interest and the type of signal or characteristic that is being monitored. The processor portion 130 may comprise or utilize a transceiver configured for wired or wireless communications as mentioned above.

Given a device configured like the example shown in FIG. 2, any individual familiar with routine and common safety practices, can locate an appropriate mounting location and "clamp" the unit in place to complete installation within minutes. The monitoring device 22 need not be physically, electrically connected to the machine or its components and can provide an indication of productivity in a non-invasive manner.

The data obtained by the monitoring devices 22-30 is used by the reporting device 44 to provide value added activity or productivity reports to the individuals operating or otherwise utilizing the various machines or stations. In some examples, the reporting device 44 provides a productivity report dynamically with updated indications regarding the characteristic or feature of a process or event based on current productivity characteristics. In the example of FIG. 1, the reporting device includes a communication module configured for receiving the data obtained by the monitoring devices 22-30. A processor is particularly configured or programmed to interpret the obtained data and relate it to a particular portion of a productivity report so that meaningful information is available to a machine operator or individual involved in a process of interest, for example.

The example reporting device has (or communicates with) a display 52 that provides a visual representation of the value added activity or productivity report. In some examples a display 52 (or a print out) is made available to each individual who receives a personalized productivity report and in some cases each machine or station has a dedicated display. The monitoring devices may communicate directly with corresponding displays in some such embodiments.

The information from the monitoring devices may be collected centrally to provide reports to a plant manager, for example, in addition to providing the individual productivity reports.

Figure 3:
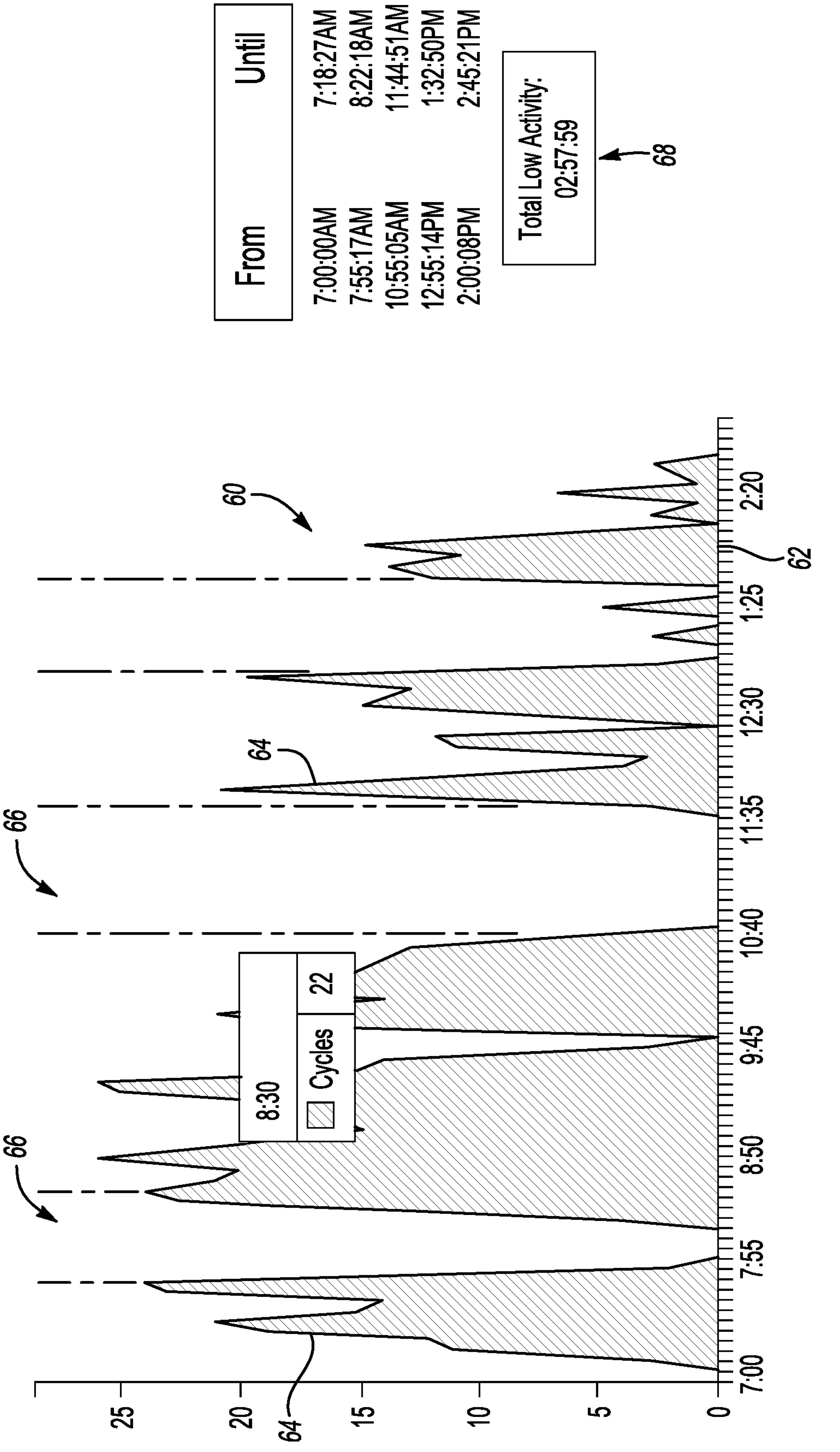
FIG. 3 illustrates an example productivity report format containing example productivity information.

In this example, the output on the display 52 is presented at least partially graphically in a manner that provides a visual indication of productivity over a selected period such as a work day. FIG. 3 shows one example productivity report 60, which includes information regarding how many machine or station cycles are completed during a work day for discussion purposes. The example productivity report provides a visual representation quantifying the value added work being done on a continuous basis. This approach provides operator performance information, which is not the same as simply reporting machine performance. Given this description those skilled in the art will realize how to customize a similar report to meet their particular objectives or needs.

In this example, information is presented with respect to a time of day shown along a lower axis 62. A plot 64 indicates the number of machine or station cycles successfully completed over time. The area under the plot 64 is shaded to enhance the ability of the individual to see how their productivity during one segment of a day compared to another and to get a sense of overall productivity.

During times when the number of machine cycles fell beneath some predetermined threshold (e.g., a value at which the machine or station appears idle to a corresponding sensor) the productivity report 60 includes distinctly marked or otherwise visually distinct intervals or regions 66 to provide an easily visible indicator of how much of the work day was not productive. For example, the time period under consideration in FIG. 2 included five distinct intervals during which the machine or station was not used. In some embodiments where the monitoring device is configured to indicate when a machine malfunction occurs, the intervals or regions 66 may be color-coded, for example, to indicate a particular traceable reason for a lull in value added activity.

The example report 60 of FIG. 3 also includes an indication at 68 of the total time when activity was low and specifies the times corresponding to the intervals or regions 66. This provides the individual with specific information that may be useful to identify trends over time or to correlate working or machine conditions at a particular instance with a lull in activity.

The productivity report 60 shows, for example, that productivity was relatively high before 11 am and then quite lower after 1 pm. This visual may show the individual that effort (or perhaps ability to perform for one or more reasons) in the morning exceeded that in the afternoon. The individual can use that to reflect on the day and determine whether any issues need to be addressed or if some changes to work habits may enhance their work satisfaction, productivity, or both.

With the type of information available in the example productivity report 60, an individual may have a greater sense of satisfaction in a job well done beyond the knowledge that comes from simply meeting a production goal. Additionally, the individual is better equipped to recognize trends or patterns that affect production to address those in a way that improves overall performance and work satisfaction.

Figure 4:
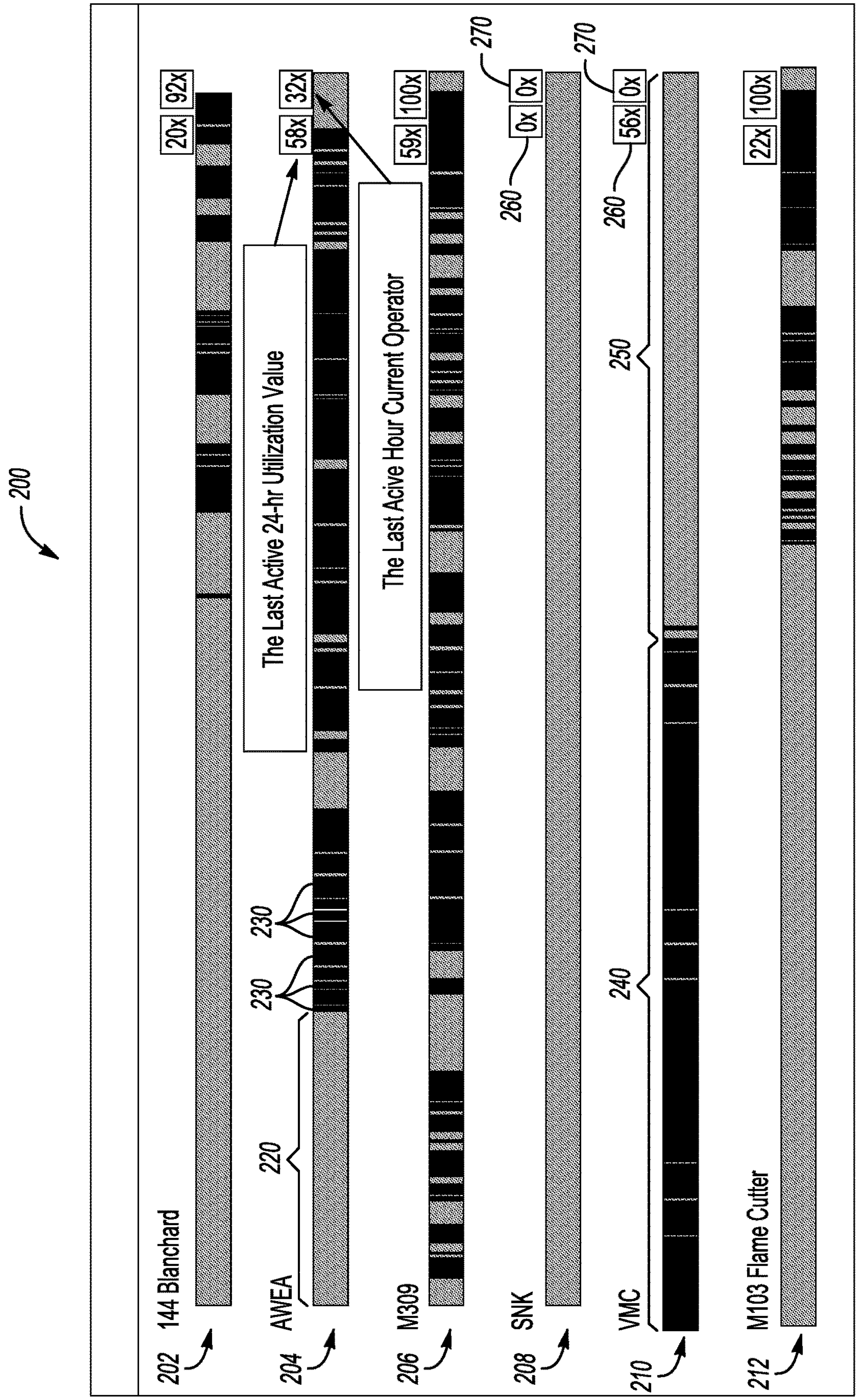
FIG. 4 illustrates another example productivity report format containing example productivity information.

Another format for a productivity report 200 is shown in FIG. 4. In this example, the productivity at each machine is represented by a horizontal bar 202-212. In the illustration shaded or darkened areas indicate periods of time during which the corresponding machine is being used in a productive or value-added manner and lightened or non-shaded areas indicate when the machine is down or idle. Considering the machine represented by the bar 204 it can be seen that the machine was idle for several hours at 220 and then was actively used almost continuously for the following several hours at 230. The example machine operation shown at 210 includes about 12 hours of continuous use at 240 followed by about 12 hours without any use at 250. The value added activity of interest may be different than just machine use and the visual report may reflect the performance of such an activity rather than machine use or non-use.

Each machine bar includes percentage use indicators at 260 and 270. The indicator at 260 shows the operator the percentage of time the machine was used in a productive manner for a value added activity of interest during the most recent 24 hours. The indicator at 270 shows the operator the efficiency or percentage of time the machine has been used productively during the last (or current) hour.

The way in which productivity information is provided according to the illustrated example embodiments allows for commoditizing value added activity of an individual controlling or using manufacturing equipment or machinery. The information and visual display provided to an individual worker provides real time feedback to that individual that helps the individual to realize a connection between certain activities or patterns and productivity. The disclosed embodiments allow an individual to address any productivity shortcomings or to enhance an ability to take advantage of or expand productivity efficiencies.

Figure 5:
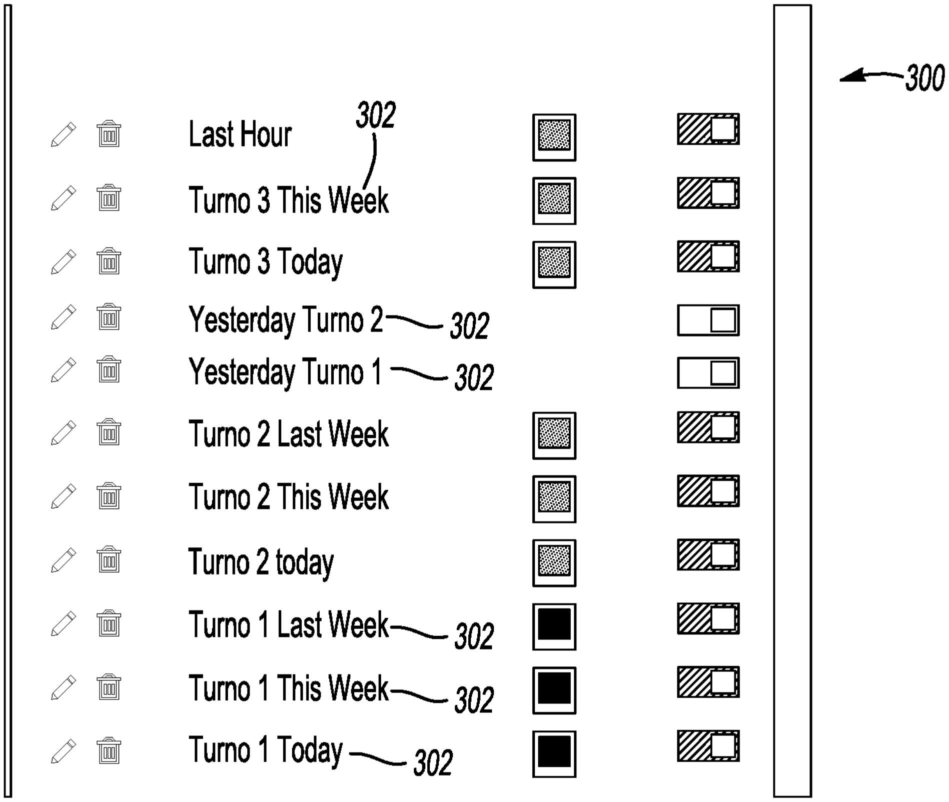
FIG. 5 schematically illustrates a customization feature of an example embodiment.

FIG. 5 illustrates a feature of some embodiments that allow for customizing the report presentation and focusing on key performance indicators. In this example, a machine operator or other authorized individual may select from a variety of possible ways to view key performance indicators. A visual display 300 includes a set of key performance indicators 302 to be monitored and included in the visual report. Available selections, such as those shown in FIG. 5, allow for selecting among different machines, different value added activities, and different time periods of interest.

The illustrated example include programming for the processor of the reporting device 44 that allows an authorized individual to create categories or specific types of value added activity or key performance indicator information to be included in the display 300 (and then in the eventual visual report of the corresponding monitored information). According to one embodiment the reporting device 44 is programmed (or accesses remotely stored programming) to facilitate establishing unique or customized key performance indicators of interest. One example includes presenting an individual with a series of drop-down or dialogue boxes that guide the individual through a process of establishing a new key performance indicator. For example, the process includes naming the key performance indicator, selecting the input (e.g., signal type or machine component) that provides the relevant indications, choosing or defining an algorithm, and choosing monitoring time periods (e.g., rolling current hour). Once established, the appropriate machine may be used and sample results reviewed to confirm that the designed key performance indicator is providing expected information.

The ability to customize key performance indicator monitoring allows a user to establish specific monitoring criteria or conditions for a variety of machine types and a variety of value adding activities in a facility without requiring different monitoring equipment or a different platform. A single system 20 provides such capability.

Figure 6:
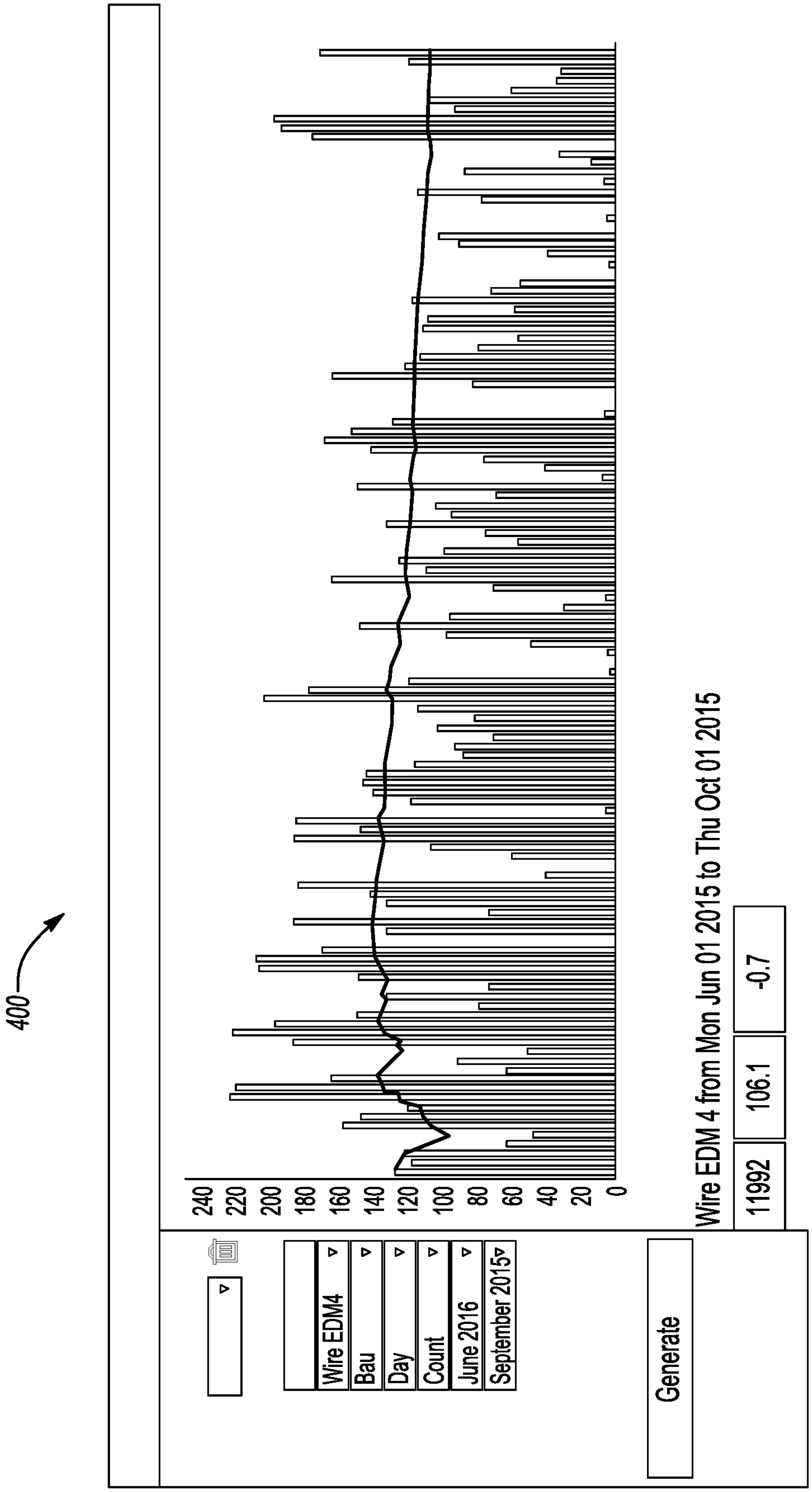
FIG. 6 illustrates another example report format.

FIG. 6 illustrates another feature of the example embodiment. The graphic report 400 of FIG. 6 shows value added activity levels over a three month period, which provides a different perspective on productivity compared to the 24 hour-based reports of FIGS. 3 and 4. The memory that is associated with or a part of the monitoring device 22, the reporting device 44, or both includes information regarding every instance detected by a monitoring device 22-30. The information includes a time stamp or other indication of the time of the monitored event. Such historical data can then be used in a variety of historical reports that may be selectively requested or generated by an authorized individual. The data may be stored in local memory or remotely using cloud-based computing or data storage services, for example.

One aspect of historical reporting using the example embodiment is that regardless of the span of the time period of interest, the report is generated in approximately the same amount of time. For example, a report covering a span of a few months may be generated in about the same amount of time that it takes to provide a report covering a span of several years. The algorithm that selects or pulls the data for such a report adjust how to select data entries to establish enough reported data points based on the length or span of the period of time of interest. One embodiment includes having a prescribed number of data points regardless of the overall time span and the frequency at which such points occur varies. Shorter reporting time periods have a more condensed or higher frequency of data points while longer reporting time periods have more spread out or lower frequency data points. This approach avoids using up processor compute capacity with large amounts of data over long reporting time periods. This allows for a quick refresh rate on an individual display screen.

Another feature of the reporting technique shown in FIG. 6 is that the efficiency associated with generating such reports allows for them to be generated on demand without a need to save the report for historical purposes. If a particular report becomes of interest again at a later time the same report can readily be generated. Additional benefit can easily be realized by obtaining an updated report that incorporates additional information that has been gathered since the last time a report was run (assuming up-to-date information is of interest).

As can be appreciated from the preceding description and drawings, a variety of embodiments of this invention are possible that facilitate providing productivity information to individuals on a customizable basis without introducing any complications or modifications to the production equipment. The type of information that can be obtained is more customizable and may be address specific needs for a variety of manufacturing processes or environments without requiring a different system or platform for monitoring value added activity.

The preceding description is illustrative rather than limiting in nature. Variations and modifications to the disclosed example embodiments are possible that do not necessarily depart from the spirit or essence of the invention. The scope of legal protection can only be determined by studying the following claims.

We claim:

1. A system for monitoring productivity, comprising:

a detector including a sensor configured to detect at least one electrical characteristic, a transmitter for communicating an indication of the detected electrical characteristic to another device, and a clip configured to position the detector in a selected position relative to a machine where the sensor can detect the at least one electrical characteristic; and a user interface including a receiver for receiving the indication of the detected electrical characteristic, a processor that interprets the received indication, relates the received indication to at least one selected value added activity, and quantifies the value added activity, wherein the value added activity corresponds to determined value added use of the machine during a manufacturing or assembly process, wherein the value added activity corresponds to a human operator performance that is distinct from machine performance during the manufacturing or assembly process, and a display that is configured to show a visual representation of the quantified value added activity.

2. The system of claim 1, wherein the clip comprises a clamping mechanism that includes at least two clamping members that are moveable between an open position and a closed position.

3. The system of claim 1, wherein the visual representation shows the value added activity based on use of the machine, and the visual representation includes a graphic that shows the value added activity over a selected time period including an indication of how much of the selected time period was used in a productive manner.

4. The system of claim 1, wherein the processor is configured to allow a user to create a plurality of different, customized key performance indicators that are monitored using the detector;

allow the user to name each performance indicator;

allow the user to select an algorithm used by the processor to relate the received indication to the selected value added activity and to quantify the value added activity;

allow the user to select a monitoring time period.

5. The system of claim 1, wherein the value added activity is a particular aspect of human operator productivity.

6. The system of claim 1, wherein the selected value added activity is based on at least one of the group consisting of a machine status, a component status, a component position, and a component movement.

7. The system of claim 1, wherein the visual representation provides real time feedback to a human operator that is configured to allow the human operator to realize a connection between activities or patterns and productivity.

8. The system of claim 1, wherein the visual representation includes an indicator of how much of a work day was not productive.

9. The system of claim 8, wherein the visual representation includes color coding to indicate a reason for a lull in the value added activity.

10. The system of claim 1, wherein the value added activity includes at least one aspect of a pattern of the human operator.

11. The system of claim 1, wherein the value added activity includes at least one aspect of a productivity of the human operator.

12. The system of claim 2, wherein the sensor is at least partially supported by at least one of the clamping members.

13. The system of claim 3, wherein the selected time period corresponds to a length of a work day.

14. The system of claim 3, wherein the visual representation shows a level of production during a plurality of time intervals within the selected time period.

15. The system of claim 3, wherein the visual representation includes a representation of time intervals within the selected time period during which production was below a preselected threshold.

16. The system of claim 12, wherein the sensor is supported within at least one of the clamping members.

17. The system of claim 16, wherein the sensor comprises a split toroid coil.

18. A system for monitoring productivity, comprising:

a detector including a sensor configured to detect at least one electrical characteristic, a transmitter for communicating an indication of the detected electrical characteristic to another device, and a clip configured to position the detector in a selected position relative to a machine where the sensor can detect the at least one electrical characteristic;

a receiver for receiving the indication of the detected electrical characteristic; and a processor that interprets the received indication, relates the received indication to at least one selected value added activity, and quantifies the value added activity, wherein the value added activity corresponds to determined value added use of the machine during a manufacturing or assembly process, wherein the value added activity corresponds to a human operator performance that is distinct from machine performance during the manufacturing or assembly process, and wherein the value added activity includes at least one aspect of a pattern or a productivity of the human operator.

19. The system of claim 18, comprising a display that is configured to show a visual representation of the quantified value added activity that represents the value added use of the machine during the manufacturing or assembly process.

20. The system of claim 19, wherein the visual representation provides real time feedback to a human operator that is configured to allow the human operator to realize a connection between activities or patterns and productivity.

* * * * *